United States Patent
Wong et al.

(10) Patent No.: US 11,528,753 B2
(45) Date of Patent: Dec. 13, 2022

(54) COMMUNICATIONS METHODS AND INFRASTRUCTURE EQUIPMENT FOR PROVIDING AN INDICATION OF DATA TRANSMISSION WITHOUT A RADIO CONNECTION

(71) Applicant: Sony Corporation, Tokyo (JP)

(72) Inventors: Shin Horng Wong, Basingstoke (GB); Martin Warwick Beale, Basingstoke (GB); Vivek Sharma, Basingstoke (GB); Yassin Aden Awad, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 16 days.

(21) Appl. No.: 17/265,219

(22) PCT Filed: Aug. 7, 2019

(86) PCT No.: PCT/EP2019/071256
§ 371 (c)(1),
(2) Date: Feb. 2, 2021

(87) PCT Pub. No.: WO2020/030711
PCT Pub. Date: Feb. 13, 2020

(65) Prior Publication Data
US 2021/0259024 A1    Aug. 19, 2021

(30) Foreign Application Priority Data

Aug. 9, 2018    (EP) ..................................... 18188366

(51) Int. Cl.
*H04W 74/08*    (2009.01)
*H04L 1/18*    (2006.01)
(Continued)

(52) U.S. Cl.
CPC ....... *H04W 74/0833* (2013.01); *H04L 1/1896* (2013.01); *H04W 68/005* (2013.01); *H04W 74/006* (2013.01)

(58) Field of Classification Search
CPC ........... H04W 74/0833; H04W 68/005; H04W 74/006; H04L 1/1896
See application file for complete search history.

(56) References Cited

U.S. PATENT DOCUMENTS

| 10,299,244 | B2 * | 5/2019 | Griot .................... H04W 68/005 |
| 2009/0274077 | A1 * | 11/2009 | Meylan ................. H04W 28/06 370/328 |

(Continued)

OTHER PUBLICATIONS

International Search Report and Written Opinion dated Oct. 18, 2019, received for PCT Application PCT/EP2019/071256, Filed on Aug. 7, 2019, 11 pages.

(Continued)

*Primary Examiner* — Jael M Ulysse
(74) *Attorney, Agent, or Firm* — Xsensus LLP

(57) ABSTRACT

A method for transmitting data by an infrastructure equipment in a wireless communications network to a communications device, the method comprising transmitting by the infrastructure equipment a paging message; receiving by the infrastructure equipment a random access request, the random access request transmitted by the communications device in response to the paging message; in response to receiving the random access request, transmitting by the infrastructure equipment an indication of communications resources allocated for a transmission by the infrastructure equipment and transmitting by the infrastructure equipment an indication that the transmission by the infrastructure equipment comprises data to be transmitted while no radio connection is established between the communications (Continued)

device and the infrastructure equipment: and transmitting by the infrastructure equipment the data using the allocated communications resources.

18 Claims, 8 Drawing Sheets

(51) Int. Cl.
  *H04W 68/00* (2009.01)
  *H04W 74/00* (2009.01)

(56) References Cited

U.S. PATENT DOCUMENTS

| | | | |
|---|---|---|---|
| 2012/0238208 A1* | 9/2012 | Bienas | H04W 68/005 455/41.2 |
| 2014/0016614 A1* | 1/2014 | Velev | H04W 4/14 370/331 |
| 2014/0233538 A1* | 8/2014 | Zhang | H04W 72/1205 370/336 |
| 2014/0243038 A1* | 8/2014 | Schmidt | H04W 76/14 455/552.1 |
| 2016/0205661 A1* | 7/2016 | Ryu | H04W 68/02 455/458 |
| 2016/0374048 A1* | 12/2016 | Griot | H04W 12/037 |
| 2018/0077682 A1* | 3/2018 | Li | H04W 72/048 |
| 2018/0132284 A1* | 5/2018 | Oh | H04W 72/1289 |
| 2018/0192436 A1* | 7/2018 | Yl | H04W 72/14 |
| 2018/0213452 A1* | 7/2018 | Kim | H04L 5/0091 |
| 2019/0021069 A1* | 1/2019 | Chun | H04W 76/10 |
| 2019/0045349 A1* | 2/2019 | Kim | H04W 76/10 |
| 2019/0053034 A1* | 2/2019 | Kim | H04W 76/20 |
| 2019/0223221 A1* | 7/2019 | Johansson | H04W 68/02 |
| 2019/0268750 A1* | 8/2019 | Lee | H04W 68/00 |
| 2020/0037210 A1* | 1/2020 | Rugeland | H04W 76/27 |
| 2020/0053795 A1* | 2/2020 | Lin | H04W 76/27 |
| 2020/0187245 A1* | 6/2020 | Fujishiro | H04W 72/0413 |
| 2020/0229111 A1* | 7/2020 | Kim | H04W 28/06 |
| 2020/0267800 A1* | 8/2020 | Kim | H04W 76/38 |

OTHER PUBLICATIONS

Huawei et al., "Early Data Transmission in RACH for NB-IoT", 3GPP TSG RAN WG1 Meeting #90bis, R1-1717724, Oct. 9-13, 2017, 4 pages.
Nokia et al., "Data Transmission During Random Access Procedure", 3GPP TSG RAN WG1 Meeting #92bis, R1-1804251, Apr. 16-20, 2018, 5 pages.
Huawei et al., "Discussion on RAR for EDT in eMTC", 3GPP TSG-RAN WG2 Meeting #102, R2-1807848, May 21-25, 2018, pp. 1-2.
Huawei et al., "Remaining Potential Agreements for EDT in eMTC", 3GPP TSG RAN WG1 Meeting #92, R1-1803126, Feb. 26-Mar. 2, 2018, 4 pages.
Huawei et al., "Early DL Data Transmission", 3GPP TSG-RAN WG2 Meeting #102, R2-1807849, May 21-25, 2018, pp. 1-5.
Huawei et al., "New WID on Further NB-IoT Enhancements", 3GPP TSG RAN Meeting #75, RP-170852, Mar. 6-9, 2017, 6 pages.
3GPP, "NR; NR and NG-RAN Overall Description", Stage 2, Release 15, TS 38.300 V15.2.0, Jun. 2018, pp. 1-87.
Holma et al., "LTE for UMTS OFDMA and SC-FDMA Based Radio Access", John Wiley and Sons, 2009, pp. 25-27.
3GPP, "Study on Scenarios and Requirements for Next Generation Access Technologies", Release 14, TR 38.913 714.2.0, Mar. 2017, pp. 1-38.
ETSI, "Evolved Universal Terrestrial Radio Access (E-UTRA); Medium Access Control (MAC) Protocol Specification", 3GPP TS 36.321 version 15.2.0 Release 15, Jul. 2018, pp. 1-127.
Ericsson et al., "New WID on Even further enhanced MTC for LTE", 3GPP TSG RAN Meeting #75, RP-170732, Mar. 6-9, 2017, 4 pages.
Ericsson, "New WID on Rel-16 MTC Enhancements for LTE", 3GPP TSG RAN Meeting #80, RP-181450, Jun. 11-14, 2018, 4 pages.
Ericsson et al., "New WID on Rel-16 Enhancements for NB-IoT", 3GPP TSG RAN Meeting #80, RP-181451, Jun. 11-14, 2018, 4 pages.
3GPP, "Evolved Universal Terrestrial Radio Access (E-UTRA); Multiplexing and Channel Coding", Release 15, TS 36.212 V15.2.0, Jun. 2018, pp. 1-245.

\* cited by examiner

COMMUNICATIONS METHODS AND INFRASTRUCTURE EQUIPMENT FOR PROVIDING AN INDICATION OF DATA TRANSMISSION WITHOUT A RADIO CONNECTION

CROSS-REFERENCE TO RELATED APPLICATIONS

The present application is based on PCT filing PCT/EP2019/071256, filed Aug. 7, 2019, which claims priority to EP 18188366.1, filed on Aug. 9, 2018, the entire contents of each are incorporated herein by reference.

BACKGROUND

Field

The present disclosure relates to communications devices, infrastructure equipment and methods for the communication by a communications device with an infrastructure equipment in a cell of a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

Another example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of terminal devices associated with different traffic profiles gives rise to new challenges for efficiently handling communications in wireless telecommunications systems that need to be addressed.

SUMMARY

The present disclosure can help address or mitigate at least some of the issues discussed above.

Embodiments of the present technique can provide a method for transmitting data by an infrastructure equipment in a wireless communications network to a communications device, the method comprising transmitting by the infrastructure equipment a paging message and receiving by the infrastructure equipment a random access request, the random access request transmitted by the communications device in response to the paging message. The method further comprises, in response to receiving the random access request, transmitting by the infrastructure equipment an indication of communications resources allocated for a transmission by the infrastructure equipment and transmitting by the infrastructure equipment an indication that the transmission by the infrastructure equipment comprises data to be transmitted while no radio connection is established between the communications device and the infrastructure equipment. The method also comprises transmitting by the infrastructure equipment the data using the allocated communications resources.

Embodiments of the present technique, which further relate to infrastructure equipment, methods of operating communications devices and infrastructure equipment and circuitry for communications devices and infrastructure equipment, allow for efficient transmission of data from infrastructure equipment to communications devices.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
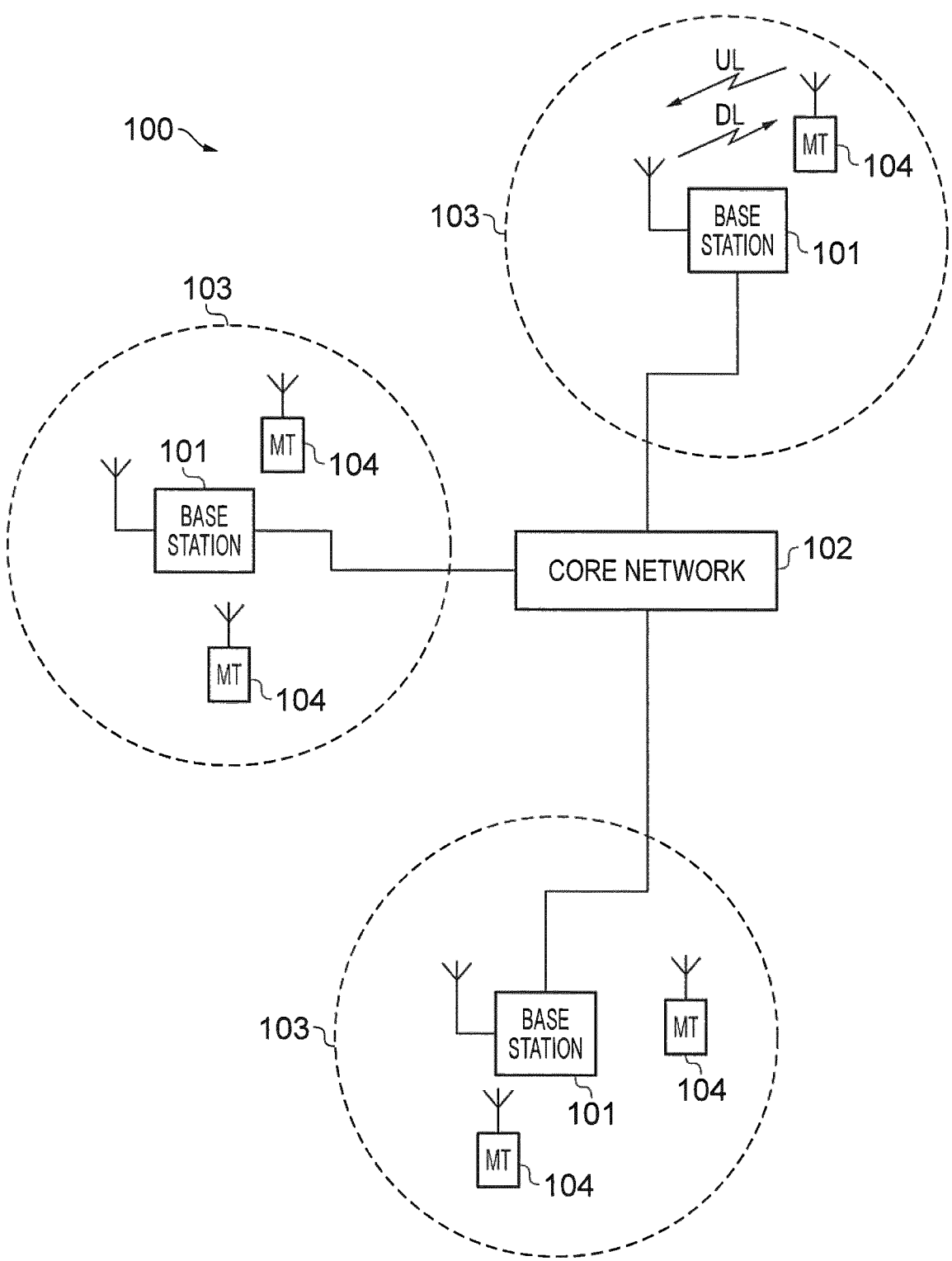
FIG. 1 schematically represents some aspects of a LTE-type wireless telecommunication system which may be configured to operate in accordance with example embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from terminal devices 104. Data is transmitted from the base stations 101 to the terminal devices 104 within their respective coverage areas 103 via a radio downlink. Data is transmitted from the terminal devices 104 to the base stations 101 via a radio uplink. The core network part 102 routes data to and from the terminal devices 104 via the respective base stations 101 and provides functions such as authentication, mobility management, charging and so on. Terminal devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, example embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
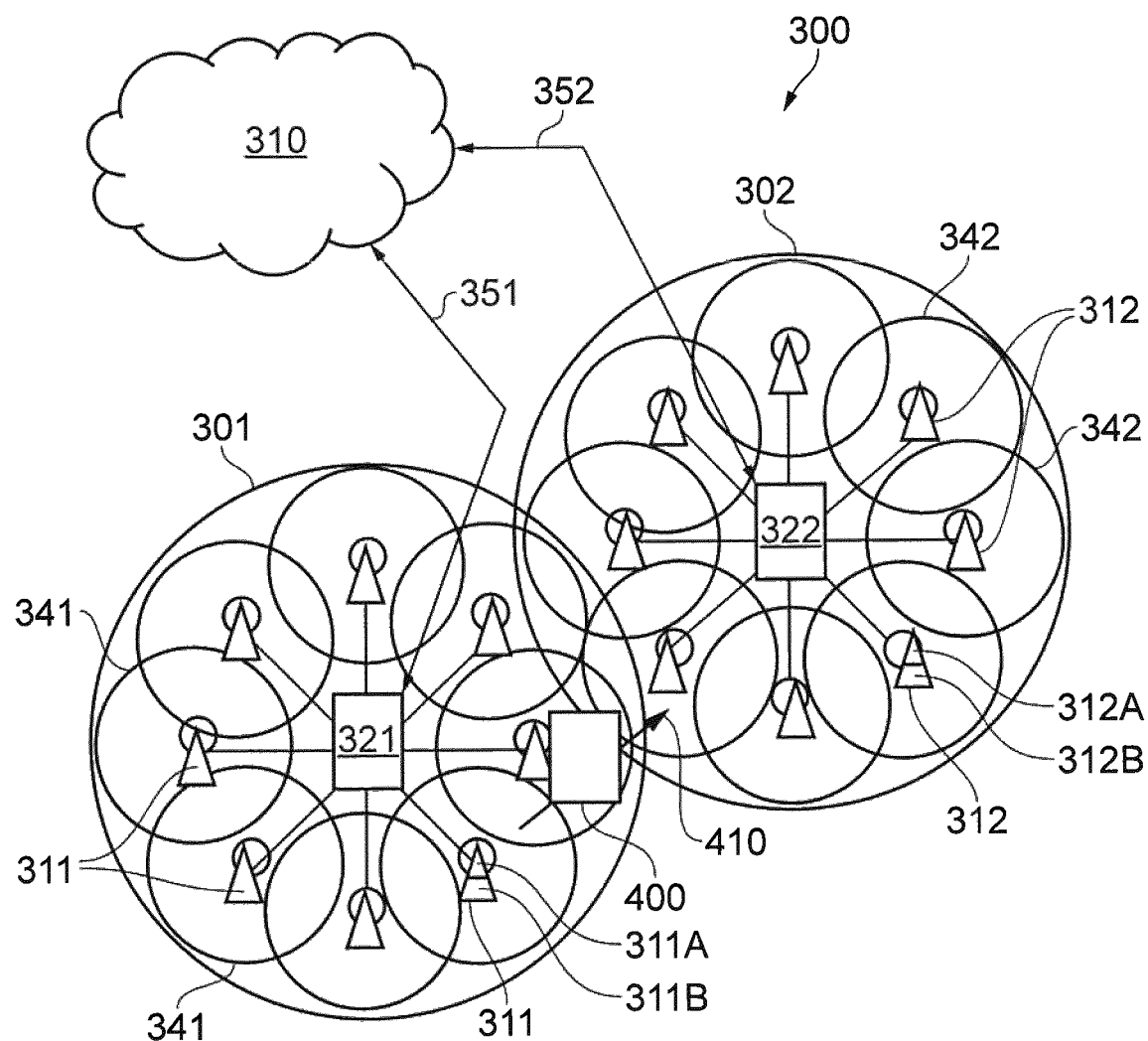
FIG. 2 schematically represents some example aspects of a new radio access technology (RAT) wireless communications network which may be configured to operate in accordance with embodiments of the present disclosure.

FIG. 2 is a schematic diagram illustrating a network architecture for a new RAT wireless communications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302. Each distributed unit 311, 312 includes transceiver circuitry for transmission and reception of wireless signals and processor circuitry configured to control the respective distributed units 311, 312.

In terms of broad top-level functionality, the core network component 310 of the new RAT communications network represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated that the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 400. That is to say, in some cases the terminal device may not be aware of which distributed unit is responsible for routing communications between the terminal device 400 and the controlling node 321 of the communication cell 301 in which the terminal device is currently operating, or even if any distributed units 311 are connected to the controlling node 322 and involved in the routing of communications at all. In such cases, as far as the terminal device is concerned, it simply transmits uplink data to the controlling node 321 and receives downlink data from the controlling node 322 and the terminal device has no awareness of the involvement of the distributed units 311, though may be aware of radio configurations transmitted by distributed units 311. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 321, 322 and/or a TRP 311, 312 of the kind shown in FIG. 2 which is adapted to provide functionality in accordance with the principles described herein.

In wireless telecommunications networks, such as LTE type or 5G type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to the RRC connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

Thus a conventional way for a terminal device (UE) in the RRC idle mode to exchange data with a network involves the terminal device first performing an RRC connection procedure (random access procedure) with the network.

After establishing an RRC connection and exchanging the relevant data, the UE may then perform RRC disconnection and move back into idle mode for power saving.

A wireless telecommunications network, such as a 5G (NR) network may support an RRC Inactive (RRC_INACTIVE) mode, in which, as in the RRC idle mode, it may not transmit data, but must transition to the RRC connected mode in order to transmit or receive data. In both the RRC Inactive and RRC Idle modes, mobility (i.e. change of serving cell) is by means of UE-based cell reselection in accordance with parameters transmitted by the wireless telecommunications network. In the RRC connected mode, mobility may be network-controlled; that is, a handover may be initiated by an infrastructure equipment of the network. The handover may be conventionally initiated in response to, for example, measurement reports transmitted by the terminal device, which may indicate the result of measurements of downlink signals transmitted by the network in both the serving cell and one or more neighbour (candidate) cells.

New Radio Access Technology (5G)

As mentioned above, the embodiments of the present invention can also find application with advanced wireless communications systems such as those referred to as 5G or New Radio (NR) Access Technology. The use cases that are considered for NR include:

Enhanced Mobile Broadband (eMBB)

Massive Machine Type Communications (mMTC)

Ultra Reliable & Low Latency Communications (URLLC) [1]

eMBB services are characterised by high capacity with a requirement to support up to 20 Gb/s. The requirement for URLLC is a reliability of 1-10-5 (99.999%) for one transmission of a 32 byte packet with a user plane latency of 1 ms [3].

The elements of the wireless access network shown in FIG. 1 may be equally applied to a 5G new RAT configuration, except that a change in terminology may be applied as mentioned above.

Conventionally, in order to transmit data in the downlink (e.g. from the infrastructure equipment 101 to the communications device 104), it has been a pre-requisite that an RRC connection be established. However, in many applications, the amount of data to be transmitted is very small, such that the signalling overhead associated with the RRC connection establishment procedure is very high, compared with the amount of data to be transmitted.

There is thus a need to provide an improved method of transmitting downlink data in a wireless communications system.

According to embodiments of the present disclosure, there is provided a method for transmitting data by an infrastructure equipment in a wireless communications network to a communications device, the method comprising transmitting by the infrastructure equipment a paging message and receiving by the infrastructure equipment a random access request, the random access request transmitted by the communications device in response to the paging message. The method further comprises, in response to receiving the random access request, transmitting by the infrastructure equipment an indication of communications resources allocated for a transmission by the infrastructure equipment and transmitting by the infrastructure equipment an indication that the transmission by the infrastructure equipment comprises data to be transmitted while no radio connection is established between the communications device and the infrastructure equipment. The method also comprises transmitting by the infrastructure equipment the data using the allocated communications resources.

Figure 3:
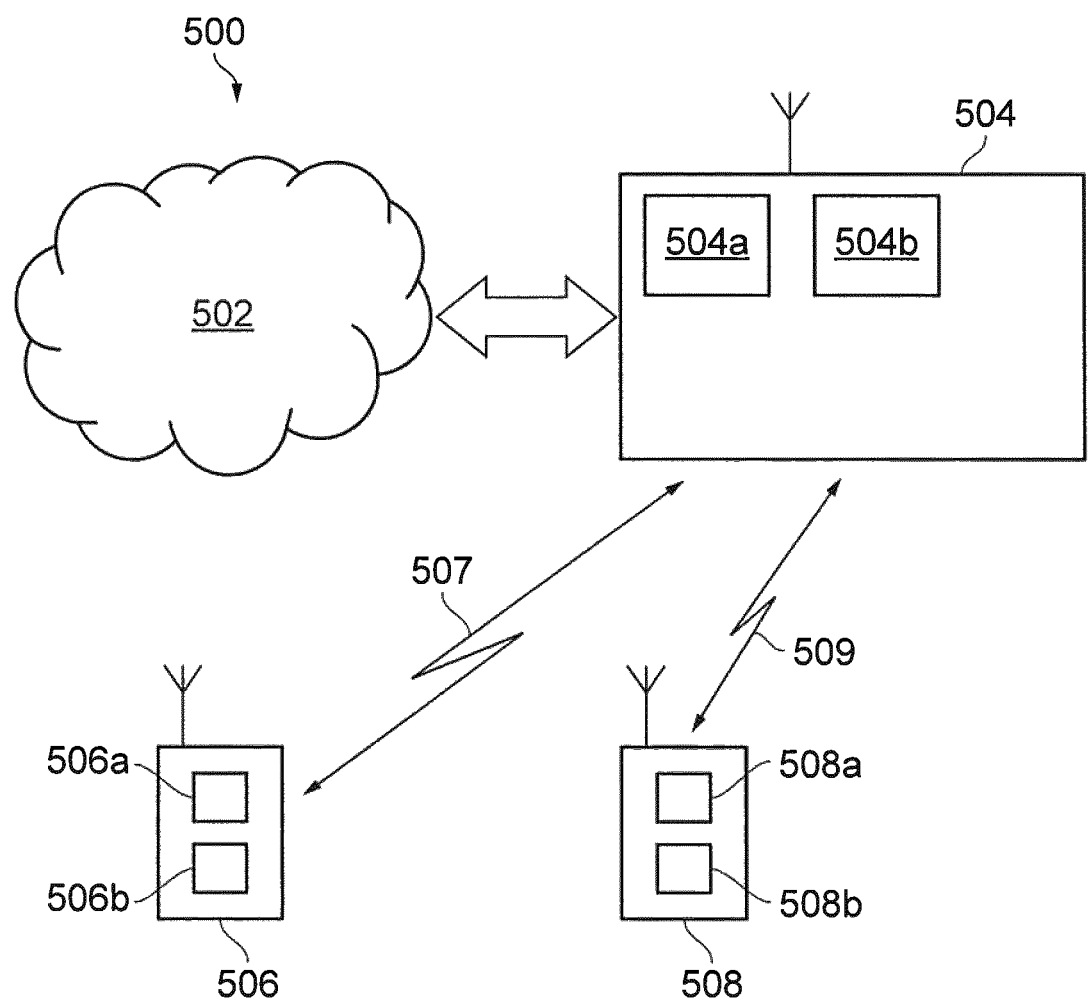
FIG. 3 schematically shows a telecommunications system according to an embodiment of the present disclosure.

FIG. 3 schematically shows a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 3 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service (EPS) connections with the terminal devices 506, 508 operating in the communications system based on subscriber information stored in a home subscriber server (HSS). Other network components in the core network (also not shown for simplicity) include a policy charging and resource function (PCRF) and a packet data network gateway (PDN-GW) which provides a connection from the core network part 502 to an external packet data network, for example the Internet. As noted above, the operation of the various elements of the communications system 500 shown in FIG. 3 may be broadly conventional apart from where modified to provide functionality in accordance with embodiments of the present disclosure as discussed herein.

The terminal devices 506, 508 (which may correspond to the terminal device 104) comprise transceiver circuitry 506$a$, 508$a$ (which may also be referred to as a transceiver/transceiver unit) for transmission and reception of wireless signals and processor circuitry 506$b$, 508$b$ (which may also be referred to as a processor/processor unit) configured to control the devices 506, 508. The processor circuitry 506$b$, 508$b$ may comprise various sub-units/sub-circuits for providing functionality as explained further herein. These sub-units may be implemented as discrete hardware elements or as appropriately configured functions of the processor circuitry. Thus the processor circuitry 506$b$, 508$b$ may comprise circuitry which is suitably configured/programmed to provide the desired functionality using conventional programming/configuration techniques for equipment in wireless telecommunications systems. The transceiver circuitry 506$a$, 508$a$ and the processor circuitry 506$b$, 508$b$ are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the terminal devices 506, 508 will in general comprise various other elements associated with its operating functionality, for example a power source, user interface, and so forth, but these are not shown in FIG. 3 in the interests of simplicity.

The base station 504 (which may correspond to the infrastructure equipment 101) comprises transceiver circuitry 504$a$ (which may also be referred to as a transceiver/transceiver unit) for transmission and reception of wireless signals and processor circuitry 504$b$ (which may also be referred to as a processor/processor unit) configured to control the base station 504 to operate in accordance with embodiments of the present disclosure as described herein. The processor circuitry 504$b$ may comprise various sub-units/sub-circuits for providing desired functionality as explained further herein. These sub-units may be implemented as discrete hardware elements or as appropriately configured functions of the processor circuitry. Thus the processor circuitry 504$b$ may comprise circuitry which is suitably configured/programmed to provide the desired functionality described herein using conventional programming/configuration techniques for equipment in wireless telecommunications systems. The transceiver circuitry 504$a$ and the processor circuitry 504$b$ are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality.

Thus, the base station 504 is configured to communicate data with the terminal devices 506, 508 according to an embodiment of the disclosure over respective communication links 507, 509. The base station 504 is configured to communicate with the terminal device 506 over the associated radio communication link 507 and with the terminal device 508 over the associated radio communication link 509 generally following the established principles of LTE-based or 5G/NR communications, apart from using modified procedures in accordance with certain embodiments of the present disclosure as described herein.

Figure 4:
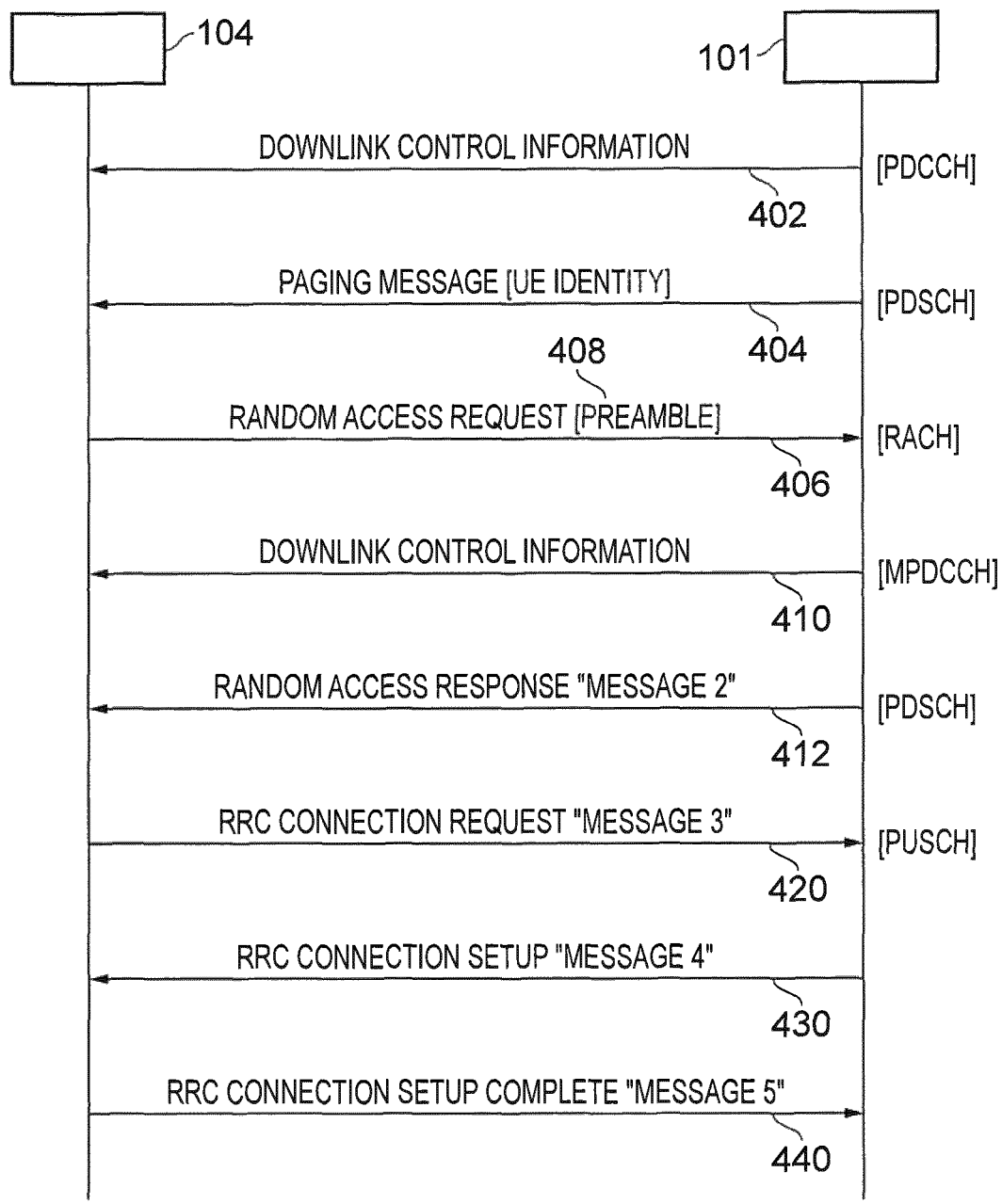
FIG. 4 shows a message sequence chart illustrating a conventional procedure for initiating a downlink (which may be also referred to as 'mobile terminated') data transmission.

FIG. 4 shows a message sequence chart illustrating a conventional procedure for initiating a downlink (which may be also referred to as 'mobile terminated') data transmission.

In response to determining that data is to be transmitted to a communications device, such as the communications device 104, the wireless communications network initiates a paging procedure. The wireless communications network may not know which cell the communications device 104 is located in, since the communications device 104 may not be required to update the network when moving between cells.

Therefore, a paging message 404 is transmitted, identifying the communications device 104, in each of the cells in which the communications device 104 could be located. Downlink control information 402 may be transmitted prior to the paging message 404 in order to indicate to communications devices that a paging message is to be transmitted, and indicating downlink communications resources on which the paging message 404 is to be transmitted.

The communications device 104 receives the paging message 404 and determines that its identity is indicated by the paging message 404. In response to this determination, the communications device 104 transmits on a random access channel a random access request 406. The random access request 406 may comprise a random access preamble 408. The random access preamble 408 may be selected at random from a group of pre-determined random access preambles allocated for the use of communications devices transmitting random access requests in the cell 103.

The random access preamble 408 may therefore not identify the communications device 104 as the transmitter of the random access request 406 to the infrastructure equipment 101.

In response to receiving the random access request 406, the infrastructure equipment 101 transmits a random access response 412 in the cell in which the random access request 406 was received. The random access response 412 may comprise a medium access control (MAC) header and a MAC payload, as will be described below. The random access response 412, being the message that follows the random access request (and not counting downlink control information), may be referred to as a 'Message 2'.

Random access response (RAR) downlink control information (DCI) 410 may be transmitted prior to the random access response 412 in order to indicate to communications devices that a random access response message is to be transmitted, and indicating downlink communications resources on which the random access response 412 is to be transmitted. The RAR DCI 410 may be formed by constructing a bit sequence indicating, for example, the downlink communications resources on which the random access response 412 is to be transmitted and other control information. A cyclic redundancy check (CRC) sequence based on the bit sequence may then be generated and the CRC sequence may then be masked (e.g. by means of a bit-wise XOR operation) by an identity. Thus, the RAR DCI 410 may comprise an identity.

In a conventional random access procedure (including where the random access procedure is initiated in response to a paging message), the RAR DCI 410 may comprise a random access radio network temporary identity (RA-RNTI), which may be pre-determined (for example, specified in a standard or broadcast in the cell) and which may thus permit the communications device 104 to determine that the RAR DCI indicates resources allocated for the transmission of a random access response and not, for example, for any other type of transmission.

In addition or alternatively, the RA-RNTI may be determined according to a pre-determined algorithm, based on one or more of a carrier frequency and a time slot used for the transmission of the random access request 408.

After transmitting the random access request 406, the communications device 104 monitors the downlink control channel, in order to determine if an RAR DCI is transmitted. On receiving the RAR DCI 410, it first identifies it is a RAR DCI, based on the pre-determined RA-RNTI. If the RA-RNTI is based on the frequency and/or time slot used for the transmission of the random access request to which the random access response 412 is a response, the communications device 104 may further determine that there is a possibility that the random access response 412 is in response to the random access request 406. (It cannot determine this definitively, because one or more other communications devices may have transmitted a random access request which results in the same RA-RNTI being used for the corresponding RAR DCI).

The communications device 104 then determines the downlink communications resources on which the random access response 412 is transmitted. It thus is able to receive and decode the random access response 412.

The random access response 412 may indicate one or more preamble identities, each associated with a respective random access request to which the random access response 412 is a response. If the communications device 104 determines that one or more such preambles corresponds to the random access preamble 408 transmitted in the random access request 406, then it determines that the random access response 412 may comprise a response to the random access request 406. (Similarly to the determination based on the RA-RNTI, it cannot conclusively determine that the random access response 412 comprises a response to the random access request 406, because another communications device may have transmitted a random access request using the same preamble).

Conventionally, the random access response 412 indicates uplink communications resources for the transmission by the communications device 104 of a radio resource control (RRC) connection request 420. The RRC connection request 420 comprises an indication of an identity of the communications device 104 which is either unique within (at least) the cell, or has a very low probability of being identical to the identity used by a different communications device within the cell. The RRC connection request 420 may be referred to as a 'Message 3'.

In response to receiving the RRC connection request 420, the infrastructure equipment 101 transmits an RRC connection setup message 430, comprising the identity of the communications device 104 as received in the RRC connection request 420. The RRC connection setup message 430 may be referred to as a 'Message 4'.

The communications device 104 receives the RRC connection setup message 430 and determines whether the identity indicated within it matches the identity included in the RRC connection request 420. If it does, then it can conclude that the RRC connection setup message 430 is intended for it, and therefore that any contention has been resolved. In response to this determination, the communications device may transmit an RRC connection setup complete message 440 to the infrastructure equipment.

Provided that the RRC connection setup complete message 440 is received by the infrastructure equipment, an RRC connection is thus established, which can be used according to conventional techniques for the transmission of downlink data by the infrastructure equipment 101 to the communications device 104.

Figure 5:
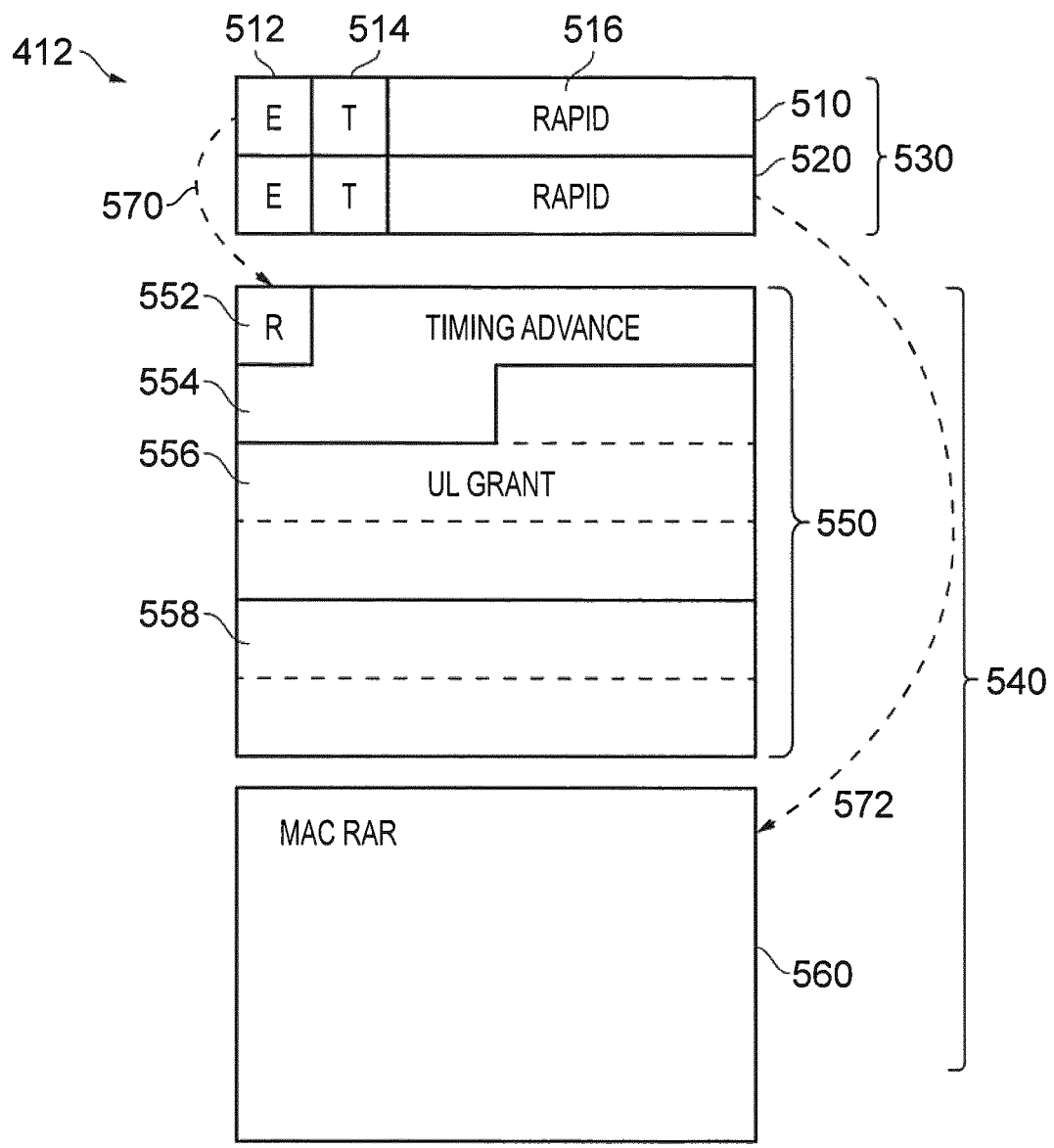
FIG. 5 diagrammatically illustrates the contents of a random access response message.

FIG. 5 diagrammatically illustrates the contents of a random access response message, such as the random access response 412 shown in FIG. 4 and described above.

In FIG. 5, each row represents an octet (eight bits), with solid lines used to indicate divisions between fields and dashed lines used to indicate divisions of octets that form part of the same field. Different portions of the message may be shown separated by vertical gaps for clarity.

The random access response 412 comprises a MAC header 530 and a MAC payload 540. The MAC payload 540 comprises one or more MAC random access responses (RAR) 550, 560 and the MAC header 530 comprises one MAC subheader (510, 520) for each MAC RAR. Correspondence between the MAC subheaders 510, 520 and the MAC RARs 550, 560 is determined based on their respective ordering (the first MAC subheader 510 corresponds to the first MAC RAR 550, and so on), as indicated by dashed arrows 570, 572 in FIG. 5.

Each MAC subheader 510, 520 consists of an 'E' header field 512, a 'T' header field 514 and a Random Access Preamble IDentifier ('RAPID') header field 516. The RAPID header field 516 in a MAC subheader may comprise an indication of a random access preamble used in a random access request to which the MAC RAR corresponding to the MAC subheader is a response; thus the communications device 104 may determine which (if any) MAC RAR is addressed to it based on the RAPID header field 516 and the preamble 408 used by the communications device 104 in its random access request 406.

Each MAC RAR 550, 560 consists of an 'R' field 552, a Timing Advance Command field 554, an uplink (UL) Grant field 556 and a Temporary cell RNTI (C-RNTI) field 558. The UL Grant field 556 may indicate uplink communications resources for the transmission of the 'Message 3' i.e. the RRC connection request 420. The details of the second MAC RAR 560 are not shown for clarity.

Each of the MAC RARs 550, 560 may be in response to a different random access request, and hence may allocate resources, by means of the respective UL Grant field 556, for a uplink transmission by a different communications device. Further details of the conventional random access response message 412 may be found in [4].

According to an embodiments of the present technique, downlink data is transmitted while no RRC connection is established.

In some embodiments, the downlink data is transmitted in the 'Message 2' in response to receiving the random access request 406.

Figure 6:
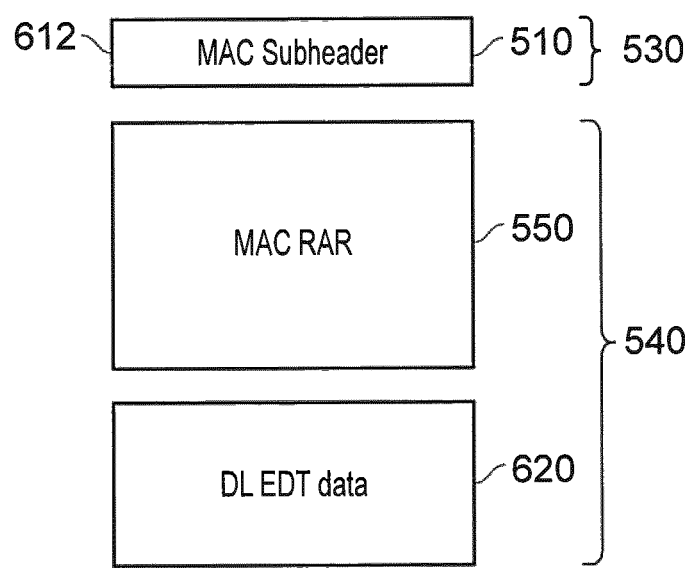
FIG. 6 illustrates a modified random access response 612 in accordance with embodiments of the present technique.

In some examples of the present technique, the downlink data is included in a modified random access response 612, as illustrated in FIG. 6.

FIG. 6 illustrates a modified random access response 612 in accordance with embodiments of the present technique.

The first modified random access response 612 comprises downlink (DL) early data transmission (EDT) data 620; that is, data which is transmitted by the infrastructure equipment 101 to the communications device 104 other than during an active RRC connection, e.g. prior to the establishment of an RRC connection, or where no RRC connection is established as a result of the RACH procedure. The DL EDT data 620 may be received by the infrastructure equipment 101 from the core network part 102. The DL EDT data 620 may comprise data received by the wireless communications network, e.g. from the internet, for transmission to the communications device 104.

The modified random access response 612 may comprise an indication of an identity of the communications device 104 that is the intended recipient of the DL EDT data 620. For example, a CRC of the modified random access response 612 may be masked with an identity (e.g. a temporary mobile subscriber identity, TMSI) associated with the communications device 104.

The modified random access response 612 may additionally comprise a conventional MAC header 530. The DL EDT data 620 may be contained within a conventional MAC payload 540, which in some embodiments may also include one or more MAC RARs 550.

In the example illustrated in FIG. 6, one each of a MAC subheader 510, MAC RAR 550 and EDT DL data 620 are shown. In some embodiments, two or more EDT DL data portions, each destined to a different communications device, may be included. For example, one EDT DL data portion may be included for each MAC subheader included in the modified random access response 612 in addition to, or instead of, a MAC RAR corresponding to each MAC subheader.

In some embodiments, the MAC subheader(s) and MAC RAR(s) included in the modified random access response 612 may be encoded and decoded in accordance with conventional techniques; in other words, may comprise fields having substantially the same meaning as in a conventional random access response 412, described above.

In some embodiments of the present technique, one or more aspects of the encoding and decoding of the fields of the MAC subheader and MAC RAR may be modified, as described herein.

In order to indicate to the communications device 104 that the random access response is a modified random access response 612, containing DL EDT data, such as the DL EDT data 620, in some embodiments, the downlink control information 410 comprises an indication of a predetermined identity. The predetermined identity may be a value of an RNTI reserved for indicating the presence of DL EDT data in the random access response. In some embodiments, therefore, instead of a conventional RA-RNTI being used to mask the CRC of the RAR DCI, a different, pre-determined RNTI, such as an early transmission of data RNTI (EDT-RNTI) is used instead.

In some embodiments, the pre-determined EDT-RNTI is specified in a specification of a standard.

In some embodiments, an indication of the pre-determined EDT-RNTI is transmitted in a broadcast message such as a system information message within the cell 103, by the infrastructure equipment 101.

In some embodiments, an indication of the pre-determined EDT-RNTI is transmitted by the infrastructure equipment 101 in a message having the communications device 104 as its sole intended recipient, such as an RRC Reconfiguration message addressed to the communications device 104.

In some embodiments, the EDT-RNTI of the downlink control information 410 is determined by the infrastructure equipment 101 based on one or more parameters. The one or more parameters may include the carrier frequency and the time slot used for the transmission of the random access request 408. In addition or alternatively, the EDT-RNTI may be determined based on a pre-determined offset, which is applied to an RNTI calculated in accordance with a conventional technique for determining an RA-RNTI. For example, where an RA-RNTI is determined based on a function f(frequency, time), where 'frequency' and 'time' refer to the frequency (e.g. the frequency of the first sub-carrier used to transmit the random access request 408) and time used for the transmission of the random access request 408, the EDT-RNTI may be determined as f(frequency, time)+MAX_RNTI+1, where MAX_RNTI is the largest possible RNTI value used in the conventional technique. Preferably, the range of possible EDT-RNTI values does not overlap with the range of possible RA-RNTI values (as for the above formula), so that a downlink control information comprising an EDT-RNTI identity cannot be misinterpreted as a response to a (different) random access request.

In some embodiments of the present technique, pre-determined values of one or more fields within the RAR DCI 410 may indicate that the random access response which is to be transmitted in the downlink communications resources indicated in the RAR DCI 410 is a modified random access response 612 comprising DL EDT data.

For example, a binary field which is conventionally set to '0' in a conventional RAR DCI may be set to '1' in some embodiments to indicate that the modified random access response 612 includes downlink data (such as the DL EDT data 620).

More specifically, in some embodiments, the RAR DCI 410 may comprise an RA-RNTI and be formatted according to a conventional format for scheduling transmissions on a physical downlink shared channel (PDSCH) for communications devices using a RACH coverage extension (CE) level 0 or 1 (e.g. in accordance with a format 6-1A [5]) in which one or more bits of a hybrid automatic repeat request (HARQ) process number field, a new data indicator field, a downlink assignment index field and a HARQ acknowledgement (HARQ-ACK) resource offset field, as specified in [10] may be set to '1' to indicate the presence of DL EDT data in the modified random access response 612.

In some embodiments, the RAR DCI 410 may comprise an RA-RNTI and be formatted according to a conventional format for scheduling PDSCH for communications devices using a RACH CE level 2 or 3 (e.g. in accordance with a format 6-1 B [5]) in which one or more bits of the hybrid automatic repeat request (HARQ) process number field, the new data indicator field, and the HARQ acknowledgement (HARQ-ACK) resource offset field, may be set to '1' to indicate the presence of DL EDT data in the modified random access response 612.

One potential benefit associated with the above two embodiments for some implementations is that the RAR DCI and the RAR message can be backward compatible. This can in some cases be beneficial, for example if the eNB is not aware whether a communications device (UE) is capable of DL EDT at the point where the RAR DCI is transmitted. If the UE is a legacy UE, e.g. a 3GPP Release15 UE, then the UE will still be able to decode the RAR DCI but it will ignore the bits used to indicate the presence of DL EDT. The RAR message can also be formatted to be backward compatible in which case the 3GPP Release15 UE would then proceed to perform a conventional RRC Connection Request or a conventional RRC Connection Resume in Message 3. If the UE transmits an RRC Connection Resume, then the network would be able to identify the UE and hence it can then transmit the DL EDT over Message 4 otherwise the network would just connect the UE. On the other hand, if the UE is capable of DL EDT, e.g. a 3GPP Release16 UE, then it may recognise this set bit(s) and then read the RAR Message and decode the underlying DL EDT (where this DL EDT can be attached to the RAR Message as one of the embodiments here or is in a separate PDSCH as per other embodiments here). The UE receiving the DL EDT over Msg 2 can then respond, for example with a modified Message 3 to indicate acknowledgement.

In some embodiments, the RAR DCI 410 may comprise an RA-RNTI and be formatted according to a conventional format, and a resource allocation field and modulation and coding scheme (MCS) field are jointly set to pre-determined values which indicate the presence of DL EDT data in the modified random access response 612.

In some embodiments, the modified random access response 612 may comprise an indication that it includes DL EDT data.

In some embodiments the 'R' bit 552 in the MAC RAR 550 indicates if, for the communications device 104 to whom the MAC RAR 550 is addressed (as determined based on the RAPID header field or the temporary C-RNTI field 558, for example the C-RNTI field 558 could be set to include at least a part, e.g. 16 bits, of a UE identifier such as an IMSI or P=TMSI), the modified random access response 612 contains DL EDT data. For example, the 'R' bit may be set to '1' by the infrastructure equipment 101 to indicate that the modified random access response 612 contains DL EDT data. Conventionally, the 'R' bit is always sent to '0' in a RACH procedure associated with a paging message (i.e. where the random access request was transmitted by the communications device 104 in response to the paging message 404). Conventionally, the 'R' bit of a MAC subheader may be set to '1' if and only if the MAC RAR associated with the MAC subheader is in response to a random access request comprising a preamble reserved for the case where the communications device 104 is requesting to transmit Uplink EDT data. Thus, the 'R' bit can be used to indicate DL EDT data, with no increase in message length required in such embodiments.

The communications device 104, receiving the modified random access response 612 determines whether it transmitted the random access request 406 (to which the MAC RAR 550 is a response) in response to the paging message 404. If so, then it interprets the setting of the 'R' bit to '1' as indicative of the presence of DL EDT data 620.

Additionally or alternatively, the communications device 104, receiving the modified random access response 612 determines whether it transmitted the random access request 406 (to which the MAC RAR 550 is a response) using a preamble reserved for requesting resources for the transmission of early uplink data. If not, then it interprets the setting of the 'R' bit to '1' as indicative of the presence of DL EDT data 620.

In some embodiments, the UL grant field 556 comprises an indication that the modified random access response 612 contains DL EDT data. For example, a predetermined combination of values assigned to the bits of a resource allocation and/or MCS field within the UL grant field 556 may indicate that the modified random access response 612 contains DL EDT data. Alternatively, a pre-determined setting of a channel state information (CSI) request bit within the UL grant field 550 may be used to indicate that the modified random access response 612 contains DL EDT data.

Conventionally, the CSI request bit is reserved (e.g. set to '0' by the transmitter) unless a random access request was transmitted in a non-contention based manner, in response to an order transmitted on a physical downlink control channel (PDCCH). Similarly, the bits of the resource allocation and/or the MCS field within the UL grant field 556 may never conventionally be set to certain combinations of values. Thus, a predetermined combination of values which is not conventionally used may be used in some embodiments to indicate the presence of DL EDT data in the modified random access response 612. Additionally or alternatively, a predetermined combination of values which is not conventionally used may be used in some embodiments to indicate a position within the modified random access response 612 and/or length of the DL EDT corresponding to the MAC RAR.

Thus, in some embodiments, the presence (and optionally, position and/or length) of DL EDT data in the modified random access response 612 can be indicated without requiring an increase in the length of the MAC RAR.

In some embodiments, the communications device 104 may be assigned an identity which remains valid during a period when no RRC connection is active. For example, the communications device 104 may be assigned an RNTI, for example as part of an RRC connection establishment, which remains valid while the communications device 104 is in a suspended state, having no active RRC connection. In some such embodiments, the infrastructure equipment 101 may indicate to the communications device 104 that the modified random access response 612 contains DL EDT data by including in the modified random access response 612 the assigned identity. The modified random access response 612 may include an indication of the assigned identity in one of the MAC header or MAC payload, or may mask the CRC of the modified random access response 612 with the assigned RNTI if the modified random access response addresses only one UE (i.e. the targeted DL EDT UE). For example, in some implementations an indication of the assigned RNTI could be included in the T-C-RNTI field 558 of the MAC RAR. In some other implementations the assigned RNTI could be used to mask CRC of the RAR DCI instead of the RA-RNTI.

As described above, a conventional random access response message 412 may contain more than one MAC RAR (and thus more than one MAC subheader), each MAC RAR being addressed to a different communications device.

In some embodiments, if the RAR DCI 410 indicates that the random access response is a modified random access response 612 containing DL EDT, and multiple MAC RARs are included in the modified random access response 612, then corresponding DL EDT data is included for each such MAC RAR (and addressed to the same communications device 104 as is indicated by the RAPID header field 516 in the respective corresponding MAC subheader). In such embodiments, if the communications device 104 determines based on the RAR DCI 410 that DL EDT data is contained within the modified random access response 612, then it accordingly determines that for each MAC subheader and MAC RAR within the modified random access response 612, there is associated DL EDT data. In such embodiments, there is thus no need for an indication, within the MAC subheader 510 or the MAC RAR 550, of whether or not there is associated DL EDT data associated with the MAC RAR 550.

In some embodiments, where multiple MAC RARs are included in the modified random access response 612, corresponding DL EDT data is included for at least one such MAC RAR. In such embodiments, if the communications device 104 determines based on the RAR DCI 410 that DL EDT data is contained within the modified random access response 612, then it further determines, based on an indication in the respective MAC subheader or MAC RAR as described above, whether there is associated with the MAC RAR any DL EDT data.

Where multiple MAC subheaders are included in the modified random access response 612, the position and length of associated DL EDT data may be indicated by means of predetermined values of bits within the associated MAC RAR, as described above.

Preferably, in embodiments in which multiple MAC subheaders may be included in the modified random access response 612, not all of which have associated DL EDT data included in the modified random access response 612, then the RAR DCI 410 comprises a conventional RA-RNTI. In such embodiments the modified random access response 612 may comprise both information (such as a conventional MAC RAR 550) directed to communications devices which either are not capable of receiving DL EDT data, or do not have DL EDT data destined for them, and DL EDT data destined to one or more other communications devices (such as the communications device 104).

As described above, in a conventional random access procedure, the MAC RAR 550, 560 comprises an UL grant field 556 indicating uplink communications resources which are conventionally used for the transmission by the communications device 104 of the 'Message 3' RRC connection request 420.

In some embodiments where the modified random access response 612 includes the DL EDT data 620, the uplink communications resources indicated by the UL grant field 556 in the MAC RAR 550 corresponding to (i.e. intended for the same communications device as) the DL EDT data 620 is used for the transmission by the communications device 104 of acknowledgement information indicating whether or not the DL EDT data 620 was received and decoded correctly (i.e. without detecting any errors) by the communications device 104.

In some embodiments of the present technique, the DL EDT data 620 is instead of, or as well as, being transmitted within the modified random access response message 612, transmitted on downlink EDT communications resources, the downlink EDT communications resources being different from those indicated by the RAR DCI 410 as being allocated for the transmission of the random access response message 412 or the modified random access response message 612. In some such embodiments, a first portion of the DL EDT data 620 may be transmitted within the modified random access response 612, and a second portion of the DL EDT data 620 may be transmitted on the downlink EDT communications resources.

In some embodiments, the downlink EDT communications resources are indicated using the bits of the MAC RAR 550 corresponding to the conventional UL grant field 556. The use of the conventional UL grant field 556 for indicating the allocated downlink EDT communications resources may be indicated by means of one or more of the techniques described herein as being suitable for indicating the presence of DL EDT data within the modified random access response 612.

In some such embodiments, the downlink EDT communications resources may comprise resources on the physical downlink shared channel (PDSCH).

Thus, in some embodiments, the communications device 104 may receive the DL EDT data on the downlink EDT communications resources on the PDSCH. The communications device 104 may indicate, by transmitting positive or negative acknowledgement information on a physical uplink control channel (PUCCH), whether or not the DL EDT data was received and decoded and determined to be free of errors. The positive or negative acknowledgement information may be transmitted in accordance with a hybrid automatic repeat request (HARQ) procedure. The resources for the PUCCH may be indicated in the UL grant 556 of the modified random access response 612 or it may be broadcasted in the SIB (similar to PUCCH resources for Message 4). The timing advance to apply to the PUCCH may be indicated in a timing advance field 554 of the MAC RAR 550.

According to such embodiments, constraints on the maximum amount of DL EDT data which could be transmitted within a single modified random access response 612 (e.g. taking into account a transport block size limitation applicable to certain categories of communications devices) need not be shared by a number of communications devices receiving DL EDT at the same time.

In some embodiments, two or more sets of downlink EDT communications resources may be indicated in two or more respective MAC RARs. As such, resources may be scheduled for DL EDT data destined to multiple communications devices using a single RAR DCI 410 and single modified random access response 612.

In some embodiments, the cell in which the communications device 104 is located may not be known to the infrastructure equipment 101. Therefore, in some embodiments, a procedure in accordance with one or more of the example techniques described herein is carried out in every possible cell in which the communications device 104 could be located, in order to ensure that the data is received by the communications device 104. For example, it could be carried out in every cell in a region within which the communications device 104 last performed a registration procedure (such as a tracking area update), and within which the communications device 104 is not required to perform any further registration procedure as a result of changing its serving cell.

In some embodiments, in order to reduce the amount of unnecessary transmissions, the procedure is carried out only in the cell which the communications device 104 was most recently known to be located; e.g. the cell in which the communications device 104 was most recently in RRC Connected mode. If, in such embodiments, no acknowledgement is received from the communications device 104 in response to the modified random access response 612, then a conventional procedure may be used in which the communications device 104 establishes an RRC connection prior to the infrastructure equipment 101 transmitting the data.

In some embodiments the preamble 408 selected for transmission in the random access request 406 is selected from one or more pre-determined device-specific preambles which are assigned to the communications device 104 by the wireless communications network 100. The one or more device-specific preambles may identify the communications device 104 uniquely amongst all communications devices which may be paged within a paging area. The paging area may correspond to the tracking area within which the communications device 104 is registered. The one or more device-specific preambles may identify the communications device 104 as supporting an EDT DL data procedure in accordance with one or more example techniques described herein.

In such embodiments, the communications device 104, in response to receiving the paging message 404 comprising the identity of the communications device 104, selects as the preamble 406 from the one or more device-specific preambles and transmits this in the random access request 406.

The paging message 404 may have been transmitted in multiple cells, including the cell 103.

Based on receiving the preamble selected from the one or more device-specific preambles, the infrastructure equipment 101 may determine that the communications device 104 is located within (i.e. has as its serving cell) the cell 103. Subsequent transmissions directed to the communications device 104 may thus be restricted to the cell 103.

In response to receiving the preamble selected from the one or more device-specific preambles, the infrastructure equipment 101, having data for transmission to the communications device 104 which is suitable for early data transmission, transmits an indication of allocated downlink communications resources, and transmits an indication that the allocated downlink communications resources are for the transmission of data being sent without the establishment of an RRC connection.

The indication of allocated downlink communications resources may be transmitted in the RAR DCI 410 or in the modified random access response 412, for example in accordance with one or more of the example techniques described herein.

The indication that the allocated downlink communications resources are for the transmission of data being sent without the establishment of an RRC connection may be transmitted in the RAR DCI 410 or in the modified random access response 412, for example in accordance with one or more of the example techniques described herein.

In some embodiments, the one or more device-specific preambles consists of a single device-specific preamble. In some embodiments, the single device-specific preamble is determined by the communications device 104 in accordance with a pre-determined rule; for example, an index of the single device-specific preamble may be determined as S-TMSI mod $N_{Preamble}$, where S-TMSI is a service architecture enhancements (SAE) temporary mobile subscriber identity (TMSI), and where $N_{Preamble}$ is a number of preambles reserved for the use by DL EDT capable communications devices. Alternatively, instead of the S-TMSI, in some embodiments the preamble index is determined using an identity assigned to the communications device 104 for use whilst in idle mode or in inactive mode. Thus, with this approach, if a communications device (UE) is configured to use a device-specific preamble, it may be configured to always use it regardless whether the paging is normal paging or paging with the intention for DL EDT (this device-specific preamble may just be used in response to paging. In a non-paging case where the UE initiates an RRC Connection Request, for example because it has uplink data to transmit, the UE might instead use a traditional preamble).

In some embodiments, the one or more device-specific preambles are indicated in broadcast transmissions, e.g. system information message transmissions of the infrastructure equipment 101 in the cell 103. In some embodiments, the one or more device-specific preambles are a subset of preambles which are indicated in broadcast system information as being available for use in the cell for random access request messages, such as in accordance with a conventional random access request procedure. In some embodiments, the one or more device-specific preambles are a set of preambles which do not overlap with the set which are indicated in broadcast system information as being available for use in the cell for random access request messages, such as in accordance with a conventional random access request procedure.

In some embodiments, the one or more device-specific preambles may comprise a plurality of sets of device-specific preambles, each of the sets of device-specific preambles being for use in a particular RACH coverage extension level. In order to select a preamble therefore, the communications device 104 may first determine which RACH coverage extension level is currently applicable to it, then selects a preamble from the set of device-specific preambles associated with the determined RACH coverage extension level. It should be appreciated that the network may configure DL EDT only for some of these RACH coverage extension levels. For example, the network may decide that a UE in very poor coverage need not be configured for DL EDT.

In some embodiments, the one or more device-specific preambles are for use in forming a random access request message which is transmitted in response to a paging message, if the paging message was transmitted in one of a predetermined set of paging occasions. The predetermined set of paging occasions may be configured (e.g. indicated in broadcast system information) by the infrastructure equipment 101.

The predetermined set of paging occasions may be a subset of a set of conventional paging occasions or a set of paging occasions distinct from the set of conventional paging occasions.

In some embodiments, the modified random access response 612 contains at most one portion of DL EDT data 620. In some such embodiments, if, following transmission of the paging message 402, the infrastructure equipment 101 determines that more than one communications device has transmitted a random access request in response to the paging message, and that a random access response 412 comprising more than one MAC RAR could therefore be transmitted, the infrastructure equipment 101 may continue the process by transmitting the random access response 412, comprising two or more of each of MAC subheaders and MAC RARs, and may refrain from indicating that data is to be sent to any of the addressed communications devices without the establishment of an RRC connection. Thus, in such embodiments, where the random access response 412 comprising two or more of each of MAC subheaders and MAC RARs is transmitted, the downlink data for each communications device may be transmitted only when an RRC connection is established with the respective communications device.

On the other hand, in some embodiments, if following transmission of the paging message 402, the infrastructure equipment 101 determines only one communications device (e.g. the communications device 104) has transmitted a random access request in response to the paging message, then a modified random access response 612 may be transmitted comprising a single MAC subheader, and the DL EDT data may be thus transmitted in accordance with the techniques described herein, without the establishment of an RRC connection.

Various aspects of the techniques described herein may be combined, examples of which will now be described.

Figure 7:
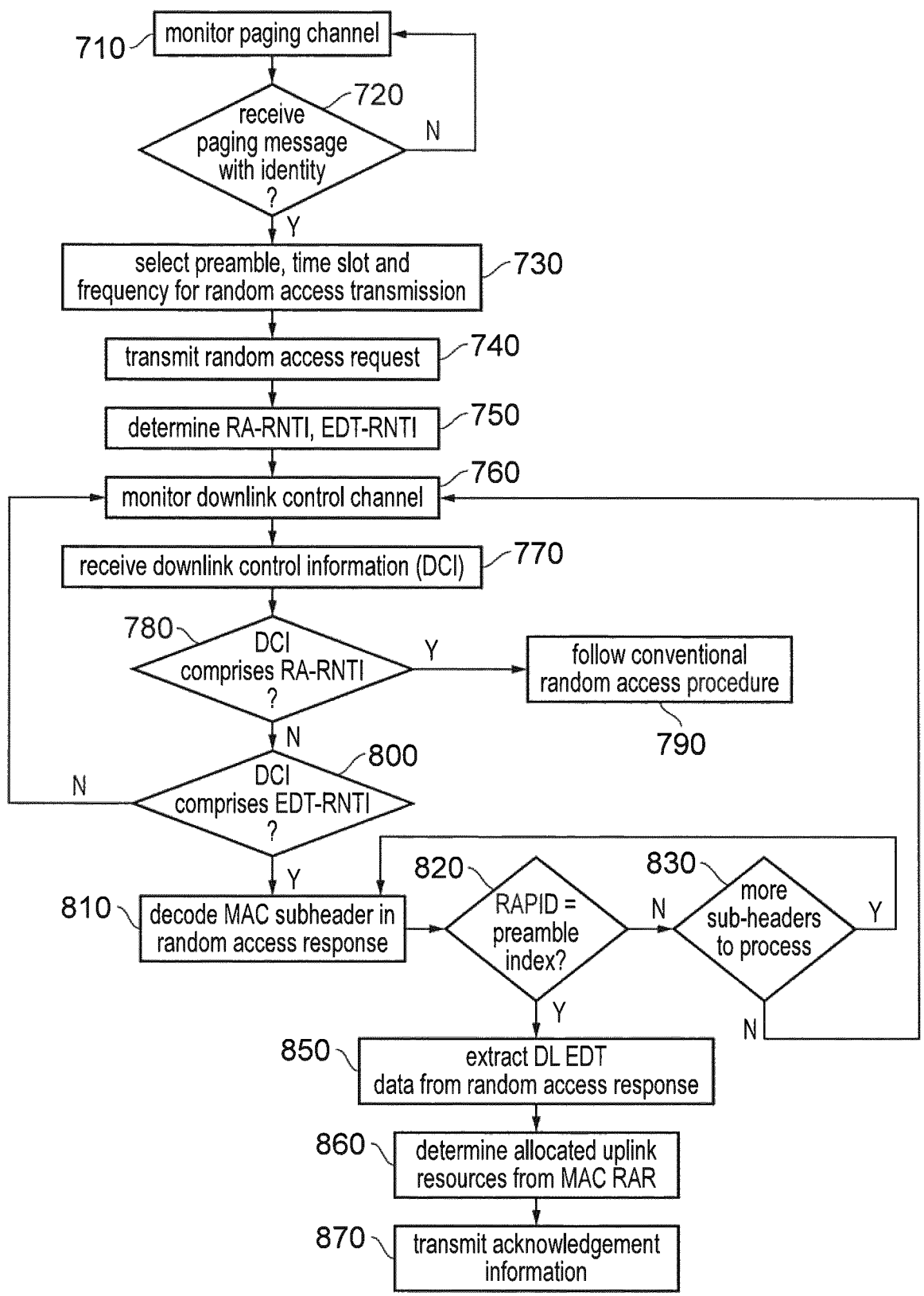
FIG. 7 illustrates a process which may be carried out by a communications device in accordance with embodiments of the present technique.

FIG. 7 illustrates a process which may be carried out by the communications device 104 in accordance with embodiments of the present technique.

The process of FIG. 7 starts at step 710. In step 710 the communications device 104 monitors a paging channel. At step 720, the communications device 104 determines whether a paging message has been received on the paging channel which includes an identity corresponding to the communications device 104. If it has, then control passes to step 730; otherwise control returns to step 710.

At step 730 the communications device 104 selects a preamble, a time slot and a frequency for a transmission of a random access request. At step 740 the communications device 104 transmits the random access request 406 using the selected preamble, time slot and frequency.

At step 750 the communications device 104 determines an RA-RNTI and an EDT-RNTI based on the time slot and frequency selected at step 730.

In step 760 the communications device 104 monitors a downlink control channel, and at step 770 receives downlink control information (DCI) on the downlink control channel.

At step 780 the communications device 104 determines whether the downlink control information (DCI) comprises the RA-RNTI determined at step 750. If it does then control passes to step 790 in which the communications device 104 follows the conventional steps of a random access procedure such as that illustrated in FIG. 4 and described above.

If at step 780 it is determined that the DCI does not include the RA-RNTI, then control passes to step 800 in which the communications device 104 determines whether the DCI comprises the EDT-RNTI determined at step 750. If it does not then control returns to step 760. If the DCI comprises the EDT-RNTI then control passes to step 810 and the communications device 104 receives and decodes the modified random access response 612; more specifically, it decodes the MAC subheader 510 in the modified random access response 612.

At step 820 the communications device determines whether the RAPID header field 516 of the MAC subheader 510 indicates an index of the preamble selected in step 750 and used for the transmission of the random access request 406 in step 740. If it does not then control passes to step 830, where the communications device determines whether there are more MAC subheaders in the modified random access response 612 to process. If there are more MAC subheaders, then control returns to step 810 and the communications device 104 decodes the next MAC subheader 520.

If at step 830 it is determined that there are no more MAC subheaders to process then the communications device 104 determines that the modified random access response 612 does not comprise a MAC RAR intended for the communications device 104; that is to say the modified random access response 612 has not been sent in response to the random access request 406 transmitted by the communications device 104 in step 740. Control may then return to step 760.

If at step 820 it is determined that the RAPID header field 516 indicates the preamble index associated with the preamble used in the random access request 406 transmitted at step 740 then control passes to step 850 and the communications device 104 extracts the DL EDT data 620 from the modified random access request 612.

Control then passes to step 860 in which the communications device 104 determines uplink communications resources allocated for the purposes of transmission of acknowledgement information by the communications device 104. The allocated uplink communications resources may be indicated in a conventional manner in the UL grant header field 556 of the MAC RAR 550 corresponding to the MAC subheader 510 containing the RAPID header field 516 indicating the index of the preamble. Finally at step 870 the communications device 104 transmits acknowledgement information indicating whether or not the DL EDT data 620 was correctly received and decoded from the modified random access response 612. The acknowledgment information is transmitted using the allocated uplink communications resources determined at step 860.

In some embodiments, one or more of the steps of the process illustrated in FIG. 7 may be omitted, modified or performed in a different order.

Figure 8:
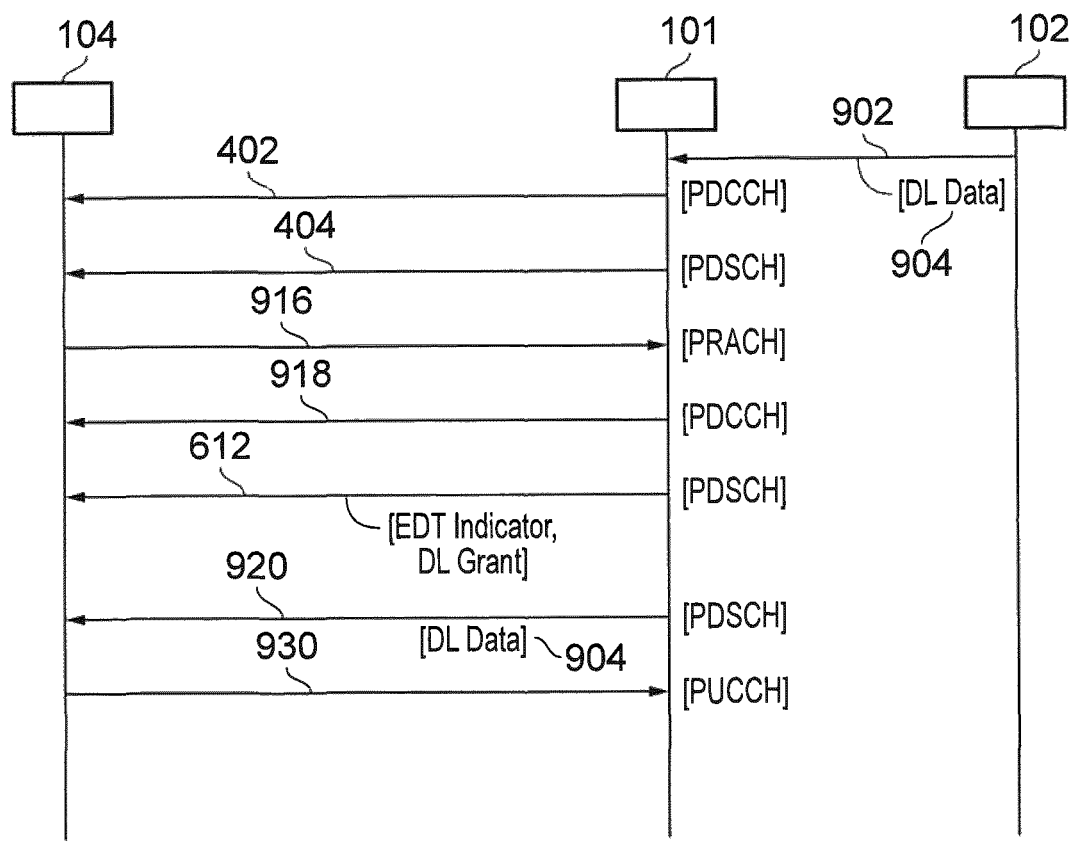
FIG. 8 illustrates a message sequence chart in accordance with embodiments of the present technique.

FIG. 8 illustrates a message sequence chart in accordance with embodiments of the present technique.

Initially (not shown in FIG. 8) the communications device 104 is allocated by the wireless communications network a device-specific preamble for the purposes of responding to paging messages when the communications device 104 supports an early data transmission in the downlink capability. The device-specific preamble may be allocated to the communications device 104 during the period when an RRC connection is active (i.e. when the communications device 104 is in the RRC connected mode). Subsequently, the communications device 104 may have been subject to a suspend procedure, in which it maintains certain context, including the device-specific preamble while in the RRC inactive mode.

The infrastructure equipment 101 receives downlink data 902, for example from the core network part 102, for transmission to the communications device 104.

In response to receiving the downlink data 902 for transmission to the communications device 104 the infrastructure equipment 101 transmits the paging message 404 on the PDSCH and, in order to indicate the resources allocated for the transmission of the paging message 404, transmits on the PDCCH downlink control information 402 which indicates the communications resources allocated for the paging message 404.

Similar paging messages (not shown) may be transmitted in other cells in order to ensure that the communications device 104 responds if it is not in the cell 103.

In response to receiving the downlink control information 402, the communications device 104 decodes the paging message 404 and determines that the infrastructure equipment 101 is attempting to communicate with (e.g. has downlink data to be transmitted to) the communications device 104. This determination may be based on the presence of an identity within the paging message 404 corresponding to an identity of the communications device 104.

In response to this determination the communications device 104, because the communications device 104 supports the downlink early data transmission feature, and has been configured with a device specific preamble, transmits a random access request 916 comprising the device specific preamble on a physical random access channel (PRACH).

In response to receiving the random access request 916 comprising the device specific preamble allocated to the communications device 104, the infrastructure equipment 101 determines that the communications device 104 is located within the cell 103 and refrains from transmitting any further paging messages in other cells, directed to the communications device 104.

In addition, in response to receiving the random access request 916 comprising the device specific preamble allocated to the communications device 104, the infrastructure equipment 101 schedules the modified random access response 612 and transmits it to the communications device 104 using the PDSCH. The infrastructure equipment 101 also transmits the downlink control information 410 (not specifically shown in the figure) indicating the downlink communication resources on which the modified random access response 612 is transmitted.

In the example of FIG. 8, the modified random access response 612 indicates that the downlink data 902 is to be transmitted by means of an early data transmission technique, as described herein, by setting the 'R' header bit 552 in the MAC RAR 550 to '1'. This also indicates that, in the bits conventionally allocated for the UL grant field 556, the infrastructure equipment 101 indicates the downlink EDT communications resources which are to be used for the transmission of the data 902 from the infrastructure equipment 101 to the communications device 104.

Based on receiving the downlink control information 410 and the modified random access response 612 the communications device 104 determines that, based on the setting of the 'R' field 552 that the bits conventionally used for the uplink grant 556 indicate downlink communication resources. Subsequently the infrastructure equipment 101 transmits the downlink data 902 in a downlink EDT message 920 on the downlink EDT communications resources on the PDSCH indicated in the modified random access response 612.

Having received the downlink EDT message 920 from the infrastructure equipment 101, the communications device 104 transmits on a physical uplink control channel (PUCCH) acknowledgement information 930, indicating whether or not the downlink EDT message 920 containing the downlink data 902 was correctly received.

In some embodiments, additionally or alternatively, the indication that the downlink data 902 is to be transmitted by means of an early data transmission technique, as described herein and that, in the bits conventionally allocated for the UL grant field 556 of the modified random access response 612, the infrastructure equipment 101 indicates the downlink EDT communications resources, may be by means of masking the CRC of the downlink control information 918 with the EDT-RNTI which may be determined based on the time and frequency used for the transmission of the random access request 916.

Thus there has been described a method (and corresponding apparatus and integrated circuitry) for transmitting data by an infrastructure equipment in a wireless communications network to a communications device, the method comprising transmitting by the infrastructure equipment a paging message and receiving by the infrastructure equipment a random access request, the random access request transmitted by the communications device in response to the paging message. The method further comprises, in response to receiving the random access request, transmitting by the infrastructure equipment an indication of communications resources allocated for a transmission by the infrastructure equipment and transmitting by the infrastructure equipment an indication that the transmission by the infrastructure equipment comprises data to be transmitted while no radio connection is established between the communications device and the infrastructure equipment. The method also comprises transmitting by the infrastructure equipment the data using the allocated communications resources.

There has also been described a method (and corresponding apparatus and integrated circuitry) for receiving data, e.g. transmitted by an infrastructure equipment or other element, in a wireless communications network to a communications device, the method comprising: receiving a paging message; in response to receiving the paging message, transmitting by the communications device a random access request; receiving an indication of communications resources allocated for a transmission to the communications device and an indication that the transmission comprises data to be transmitted while the communications device is not in a radio resource connected mode, the indication of communications resources allocated for a transmission to the communications device and an indication that the transmission comprises data to be transmitted while the communications device is not in a radio resource connected mode being transmitted in response to the random access request, and receiving the data using the allocated communications resources.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not only applicable to certain types of terminal device, but can be applied more generally in respect of any types of terminal device, for example the approaches are not limited to machine type communication devices/IoT devices or other narrowband terminal devices, but can be applied more generally, for example in respect of any type terminal device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a terminal device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method for transmitting data by an infrastructure equipment in a wireless communications network to a communications device, the method comprising: transmitting by the infrastructure equipment a paging message; receiving by the infrastructure equipment a random access request, the random access request transmitted by the communications device in response to the paging message; in response to receiving the random access request, transmitting by the infrastructure equipment an indication of communications resources allocated for a transmission by the infrastructure equipment and transmitting by the infrastructure equipment an indication that the transmission by the infrastructure equipment comprises data to be transmitted while no radio connection is established between the communications device and the infrastructure equipment; and transmitting by the infrastructure equipment the data using the allocated communications resources.

Paragraph 2. A method according to paragraph 1, wherein the indication that the transmission by the infrastructure equipment comprises data to be transmitted while no radio connection is established between the communications device and the infrastructure equipment is transmitted in one or more of a random access response and downlink control information.

Paragraph 3. A method according to paragraph 1 or paragraph 2, wherein the indication of the communications resources allocated for the transmission by the infrastructure equipment is transmitted within the random access response.

Paragraph 4. A method according to any of paragraphs 1 to 3, wherein the data is transmitted in association with the random access response.

Paragraph 5. A method according to paragraph 1 or paragraph 2, wherein the indication of the communications resources allocated for the transmission by the infrastructure equipment is transmitted within the downlink control information.

Paragraph 6. A method according to any of paragraphs 1 to 5, the method further comprising: transmitting by the infrastructure equipment an indication of uplink communications resources allocated for a transmission by the communications device.

Paragraph 7. A method according to paragraph 6, the method further comprising: receiving acknowledgement information associated with the data, the acknowledgement information transmitted by the communications device using the allocated uplink communications resources.

Paragraph 8. A method according to any of paragraphs 1 to 7, wherein the radio connection is a radio resource control (RRC) connection.

Paragraph 9. A method according to any of paragraphs 1 to 8, wherein the indication that the transmission by the infrastructure equipment is of data to be transmitted while no radio connection is established between the communications device and the infrastructure equipment comprises a pre-determined radio network temporary identity.

Paragraph 10. A method according to any of paragraphs 1 to 9, the method comprising: receiving the data from a core network part of the wireless communications network, wherein the paging message is transmitted in response to receiving the data.

Paragraph 11. A method according to any of paragraphs 1 to 10, wherein the random access request does not comprise an indication of an identity of the communications device.

Paragraph 12. A method according to any of paragraphs 1 to 10, the method comprising: transmitting to the communications device an indication of a pre-determined random access preamble, the random access preamble identifying the communications device, and wherein the random access request comprises the pre-determined random access preamble.

Paragraph 13. A method for receiving data transmitted by an infrastructure equipment in a wireless communications network to a communications device, the method comprising: receiving from the infrastructure equipment a paging message; in response to receiving the paging message, transmitting by the communications device a random access request; receiving from the infrastructure equipment an indication of communications resources allocated for a transmission by the infrastructure equipment and an indication that the transmission by the infrastructure equipment comprises data to be transmitted while no radio connection is established between the communications device and the infrastructure equipment, the indication of communications resources allocated for the transmission by the infrastructure equipment and the indication that the transmission by the infrastructure equipment comprises data to be transmitted while no radio connection is established between the communications device and the infrastructure equipment being transmitted by the infrastructure equipment in response to receiving the random access request, and receiving from the infrastructure equipment the data using the allocated communications resources.

Paragraph 14. A method according to paragraph 13, wherein the indication that the transmission by the infrastructure equipment comprises data to be transmitted while no radio connection is established between the communications device and the infrastructure equipment is transmitted in one or more of a random access response and downlink control information.

Paragraph 15. A method according to paragraph 13 or paragraph 14, wherein the indication of the communications resources allocated for the transmission by the infrastructure equipment is transmitted within the random access response.

Paragraph 16. A method according to any of paragraphs 13 to 15, wherein the data is transmitted in the random access response.

Paragraph 17. A method according to paragraph 13 or paragraph 14, wherein the indication of the communications resources allocated for the transmission by the infrastructure equipment is transmitted within the downlink control information.

Paragraph 18. A method according to any of paragraphs 13 to 17, the method comprising: receiving from the infrastructure equipment an indication of uplink communications resources allocated for a transmission by the communications device.

Paragraph 19. A method according to paragraph 18, the method comprising: transmitting acknowledgement information associated with the data using the allocated uplink communications resources.

Paragraph 20. A method according to any of paragraphs 13 to 19, wherein the radio connection is a radio resource control (RRC) connection.

Paragraph 21. A method according to any of paragraphs 13 to 20, wherein the indication that the transmission by the infrastructure equipment is of data to be transmitted while no radio connection is established between the communications device and the infrastructure equipment comprises a pre-determined radio network temporary identity.

Paragraph 22. A method according to any of paragraphs 13 to 21, wherein the paging message is transmitted by the infrastructure equipment in response to receiving the data from a core network part of the wireless communications network.

Paragraph 23. A method according to any of paragraphs 13 to 22, wherein the random access request does not comprise an indication of an identity of the communications device.

Paragraph 24. A method according to any of paragraphs 13 to 22, the method comprising: receiving by the communications device an indication of a pre-determined random access preamble, the random access preamble identifying the communications device, wherein the random access request comprises the pre-determined random access preamble.

Paragraph 25. Infrastructure equipment for transmitting data in a wireless communications network to a communications device, wherein the infrastructure equipment comprises controller circuitry and transceiver circuitry configured such that the infrastructure equipment is operable to: transmit a paging message; receive a random access request, the random access request transmitted by the communications device in response to the paging message; transmit in response to receiving the random access request an indication of communications resources allocated for a transmission by the infrastructure equipment; transmit an indication that the transmission by the infrastructure equipment comprises data to be transmitted while no radio connection is established between the communications device and the infrastructure equipment; and transmit the data using the allocated communications resources.

Paragraph 26. Integrated circuitry for infrastructure equipment for transmitting data in a wireless communications network to a communications device, wherein the integrated circuitry comprises controller circuitry and transceiver circuitry configured to operate together such that the infrastructure equipment is operable to: transmit a paging message; receive a random access request, the random access request transmitted by the communications device in response to the paging message; transmit in response to receiving the random access request an indication of communications resources allocated for a transmission by the infrastructure equipment; transmit an indication that the transmission by the infrastructure equipment comprises data to be transmitted while no radio connection is established between the communications device and the infrastructure equipment; and transmit the data using the allocated communications resources.

Paragraph 27. A communications device for receiving data transmitted by an infrastructure equipment in a wireless communications network, wherein the communications device comprises controller circuitry and transceiver circuitry configured such that the communications device is operable to: receive from the infrastructure equipment a paging message; in response to receiving the paging message, transmit a random access request; receive from the infrastructure equipment an indication of communications resources allocated for a transmission by the infrastructure equipment and an indication that the transmission by the infrastructure equipment comprises data to be transmitted while no radio connection is established between the communications device and the infrastructure equipment, the indication of communications resources allocated for the transmission by the infrastructure equipment and the indication that the transmission by the infrastructure equipment comprises data to be transmitted while no radio connection is established between the communications device and the infrastructure equipment being transmitted by the infrastructure equipment in response to receiving the random access request, and receive from the infrastructure equipment the data using the allocated communications resources.

Paragraph 28. Integrated circuitry for a communications device for receiving data transmitted by an infrastructure equipment in a wireless communications network; wherein the integrated circuitry comprises controller circuitry and transceiver circuitry configured to operate together such that the communications device is operable to: receive from the infrastructure equipment a paging message; in response to receiving the paging message, transmit a random access request; receive from the infrastructure equipment an indication of communications resources allocated for a transmission by the infrastructure equipment and an indication that the transmission by the infrastructure equipment comprises data to be transmitted while no radio connection is established between the communications device and the infrastructure equipment, the indication of communications resources allocated for the transmission by the infrastructure equipment and the indication that the transmission by the infrastructure equipment comprises data to be transmitted while no radio connection is established between the communications device and the infrastructure equipment being transmitted by the infrastructure equipment in response to receiving the random access request, and receive from the infrastructure equipment the data using the allocated communications resources.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2(Release 15)", June 2018
[2] Holma H. and Toskala A, "LTE for UMTS OFDMA and SC-FDMA based radio access", John Wiley and Sons, 2009
[3] TR 38.913, "Study on Scenarios and Requirements for Next Generation Access Technologies (Release 14)".
[4] 3GPP TS 36.321 "Evolved Universal Terrestrial Radio Access (E-UTRA); Medium Access Control (MAC) protocol specification (Release 15)", v. 15.2.0
[5] 3GPP TS 36.212, "Evolved Universal Terrestrial Radio Access (E-UTRA); Multiplexing and channel coding (Release 15)", v.15.1.0

What is claimed is:

1. A method for transmitting data by an infrastructure equipment in a wireless communications network to a communications device, the method comprising:
   transmitting, by the infrastructure equipment, a paging message;
   receiving, by the infrastructure equipment, a random access request from the communications device in response to the paging message;
   in response to receiving the random access request;
      transmitting, by the infrastructure equipment, a first indication of communications resources allocated for a transmission by the infrastructure equipment, and
      transmitting, by the infrastructure equipment, a second indication in one or more of a random access response and downlink control information separate from the paging message, the second indication indicating that the transmission comprises data to be transmitted while no radio connection is established between the communications device and the infrastructure equipment; and
   transmitting by the infrastructure equipment, the transmission including the data using the allocated communications resources.

2. The method according to claim 1, wherein the first indication is transmitted within the random access response.

3. The method according to claim 1, wherein the data is transmitted in association with the random access response.

4. The method according to claim 1, wherein the first indication is transmitted within the downlink control information.

5. The method according to claim 1, further comprising:
   transmitting, by the infrastructure equipment, a third indication of uplink communications resources allocated for a transmission by the communications device.

6. The method according to claim 5, further comprising:
   receiving acknowledgement information associated with the data, the acknowledgement information transmitted by the communications device using the allocated uplink communications resources.

7. The method according to claim 1, wherein the radio connection is a radio resource control (RRC) connection.

8. The method according to claim 1, wherein the second indication comprises a pre-determined radio network temporary identity.

9. The method according to claim 1, further comprising:
   receiving the data from a core network part of the wireless communications network, wherein
   the paging message is transmitted in response to receiving the data.

10. The method according to claim 1, wherein the random access request does not indicate an identity of the communications device.

11. The method according to claim 1, further comprising:
    transmitting, to the communications device, a third indication of a pre-determined random access preamble, the random access preamble identifying the communications device, wherein
    the random access request comprises the pre-determined random access preamble.

12. A method for receiving data transmitted by an infrastructure equipment in a wireless communications network to a communications device, the method comprising:
    receiving, from the infrastructure equipment, a paging message:
    transmitting, by the communications device in response to receiving the paging message, a random access request, receiving from the infrastructure equipment, a first indication of communications resources allocated for a transmission by the infrastructure equipment;

receiving, from the infrastructure equipment, a second indication in one or more of a random access response and downlink control information separate from the paging message, the second indication indicating that the transmission comprises data to be transmitted while no radio connection is established between the communications device and the infrastructure equipment, the first indication and the second indication being transmitted by the infrastructure equipment in response to receiving the random access request; and receiving, from the infrastructure equipment, the transmission including the data using the allocated communications resources.

13. The method according to claim 12, wherein the first indication is transmitted within the random access response.

14. The method according to claim 12, wherein the data is transmitted in the random access response.

15. The method according to claim 12, wherein the first indication is transmitted within the downlink control information.

16. The method according to claim 12, further comprising:

receiving, from the infrastructure equipment a third indication of uplink communications resources allocated for a transmission by the communications device.

17. The method according to claim 12, wherein the radio connection is a radio resource control (RRC) connection.

18. Infrastructure equipment for transmitting data in a wireless communications network to a communications device, the infrastructure equipment comprising:

controller circuitry and transceiver circuitry configured to:

transmit a paging message;

receive a random access request from the communications device in response to the paging message;

in response to reception of the random access request:

transmit a first indication of communications resources allocated for a transmission by the infrastructure equipment; and transmit a second indication in one or more of a random access response and downlink control information separate from the paging message, the second indication indicating that the transmission comprises data to be transmitted while no radio connection is established between the communications device and the infrastructure equipment; and transmit the transmission including the data using the allocated communications resources.

* * * * *